United States Patent
Ramthun et al.

(10) Patent No.: US 6,252,237 B1
(45) Date of Patent: Jun. 26, 2001

(54) LOW COST THICKNESS MEASUREMENT METHOD AND APPARATUS FOR THIN COATINGS

(75) Inventors: John A. Ramthun, Hudson, WI (US); Steven P. Floeder, Arden Hills, MN (US); Arthur T. Manning, St. Paul, MN (US); Lanny L. Harklau, Stillwater, MN (US); Gregory D. Kostuch, Mahtomedi, MN (US); Jack W. Lai, Lake Elmo, MN (US); Wenyuan Xu, Oakdale, MN (US)

(73) Assignee: 3M Innovation Properties Company, St. Paul, MN (US)

( * ) Notice: Subject to any disclaimer, the term of this patent is extended or adjusted under 35 U.S.C. 154(b) by 0 days.

(21) Appl. No.: 09/116,009

(22) Filed: Jul. 15, 1998

(51) Int. Cl.[7] ................................................ G01N 21/64
(52) U.S. Cl. ............................. 250/459.1; 250/461.1; 250/559.27
(58) Field of Search ..................... 250/459.1, 458.1, 250/451.1, 559.27, 372, 361 R, 362, 365, 358.1, 559.28

(56) References Cited

U.S. PATENT DOCUMENTS

| 3,577,885 | 5/1971 | Wells . | |
|---|---|---|---|
| 4,841,156 | 6/1989 | May et al. . | |
| 4,922,112 | * 5/1990 | Zierl et al. | 250/372 |
| 4,922,113 | * 5/1990 | Melancon | 250/372 |
| 4,956,558 | 9/1990 | Batishko et al . | |
| 5,001,353 | 3/1991 | Odake et al. . | |
| 5,281,819 | 1/1994 | Keffert et al. . | |
| 5,310,604 | * 5/1994 | Melancon et al | 428/447 |

FOREIGN PATENT DOCUMENTS

| 0 806 652 A2 | 11/1997 | (EP) . |
| 08309262 | 11/1996 | (JP) . |

OTHER PUBLICATIONS

Abstract of JP–A–08309262.

* cited by examiner

*Primary Examiner*—Constantine Hannaher
*Assistant Examiner*—Albert Gagliardi
(74) *Attorney, Agent, or Firm*—Brian E. Szymanski

(57) ABSTRACT

A method and apparatus for measuring the thickness of a coating on a coated surface. The method uses a solid state array of light-sensitive elements to measure light emitted from a fluorescing coating composition. The intensity of the emitted light corresponds to the thickness of the coating composition, and provides a fast and accurate measure of coating thickness.

6 Claims, 2 Drawing Sheets

LOW COST THICKNESS MEASUREMENT METHOD AND APPARATUS FOR THIN COATINGS

FIELD OF THE INVENTION

The present invention is directed to a method and apparatus for measuring the thickness of a coating on a substrate. More specifically, the invention is directed to a method for measuring the thickness of a coating by directing fluorescent light onto the coated surface and analyzing the intensity of light that is emitted from the coating due to fluorescence at a specific wavelength.

BACKGROUND OF THE INVENTION

Many products are manufactured by processes that include continuous coating of a substrate with a coating composition. For example, functional coating compositions are frequently applied to continuous thin films during the production of adhesive film, tape, etc. These functional coatings add important properties to the finished product. In order to perform properly, functional coatings must be applied in a manner that is predictable, controllable, and measurable. The measurement of the thickness of functional coatings applied to thin films is an important process in the manufacture and production of the products, because it allows for the application of the coatings to be monitored and controlled.

Performance of products containing coating compositions often depends upon the accuracy with which the coating compositions are applied, and the thickness of the coating compositions can be critical to performance and price. Variations in thickness of a coating composition can occur for a number of reasons, including the inherent variability of mechanisms used to apply the coatings, as well as variability of the properties of the coating composition being applied, such as variation in the temperature and the pressure at which the coating compositions are applied.

When a coating is applied in an uneven manner, product uniformity and quality can be detrimentally effected. Such non-uniformity may be experienced, for example, along the length of the web to create streaks along the web. Alternatively, non-uniformity may be experienced across the width of the web to give a banded coating. Manufacturing costs can be detrimentally increased by over-application of the coating, and quality can be affected by over-application, under-application, or uneven application.

While it is possible to measure the thickness of thin film coatings by methods known in the art, many of these methods are inadequate or have significant limitations, such as limited accuracy due to the very low signal levels. Some methods require the removal and analysis of individual samples of the coated substrate from the web. Removal of these samples hinders the manufacturing process by slowing and/or interrupting the continuous coating of the substrate. In addition, these measurement techniques provide only an incremental assessment of coating thickness and do not provide real time measurements of thickness. Other methods allow for less disruptive analysis, but do not provide sufficient indications of the thickness on all parts of the web.

Therefore, a need exists for a system and method to thoroughly, quickly, and precisely measure the thickness of a coating composition, particularly a thin coating composition applied to a film.

SUMMARY OF THE INVENTION

The present invention relates to a method of measuring the thickness of a coated surface and a system for performing such measurements. In one aspect of the present invention, the coated surface has fluorescent properties. A first wavelength of light is directed from a light source onto the coated surface such that the coated surface absorbs the light and fluoresces to emit light of a second wavelength. The intensity of the light of the second wavelength is measured by use of a solid state array of light-sensitive elements. The measured intensity of the light of this second wavelength is used to determine the thickness of the coating, and is substantially proportional to the thickness of the coating on the coated surface.

The coating on the surface is very thick in specific implementations, and may be less than 1 percent of the thickness of the substrate which it coats. In specific implementations, the coating is less than 50 nanometers thick, and in certain implementations is less than 25 nanometers thick.

In order to measure coating thickness, a surface having an unknown coating thickness is provided. In addition, a second reference surface is provided. This second surface has light emitting properties that are the same as a surface having a known coating thickness. This second surface functions as a reference "standard" or "control". The intensity of light emitted from the surface having an unknown thickness is compared to the measured intensity of light from the second surface in order to determine coating thickness. The comparison is made according to the formula:

$$\text{Coated\_Surface\_Thickness} = T_{S_i} = \frac{(T_{R_i})}{(I_{R_i} - I_{B_i})} \times (I_{S_i} - I_{B_i})$$

wherein $T_{S_i}$ = thickness of coated surface;

$T_{R_i}$ = thickness of reference;

$I_{R_i}$ = intensity of reference;

$I_{B_i}$ = intensity of backing;

$I_{S_i}$ = intensity of coated surface;

In specific implementations, the first and second wavelengths of light are in the ultraviolet spectrum. The fluorescent properties of the coated surface are developed by either adding a fluorescing material to the coating or by using a coating composition having inherent fluorescent properties. In addition, one or more optical band pass filters may be positioned intermediate the light source and the coated surface, and intermediate the coated surface and the solid state array of light sensitive elements. The optical band pass filters limit the passage to a narrow wavelength of light and allow more accurate measurements.

The above summary of the present invention is not intended to describe each illustrated embodiment of the present invention. The figures and detailed description which follow should make more aspects of the invention apparent.

BRIEF DESCRIPTION OF THE DRAWINGS

Other aspects and advantages of the invention will become apparent upon reading the following detailed description and upon reference to the drawings in which.

Figure 1:
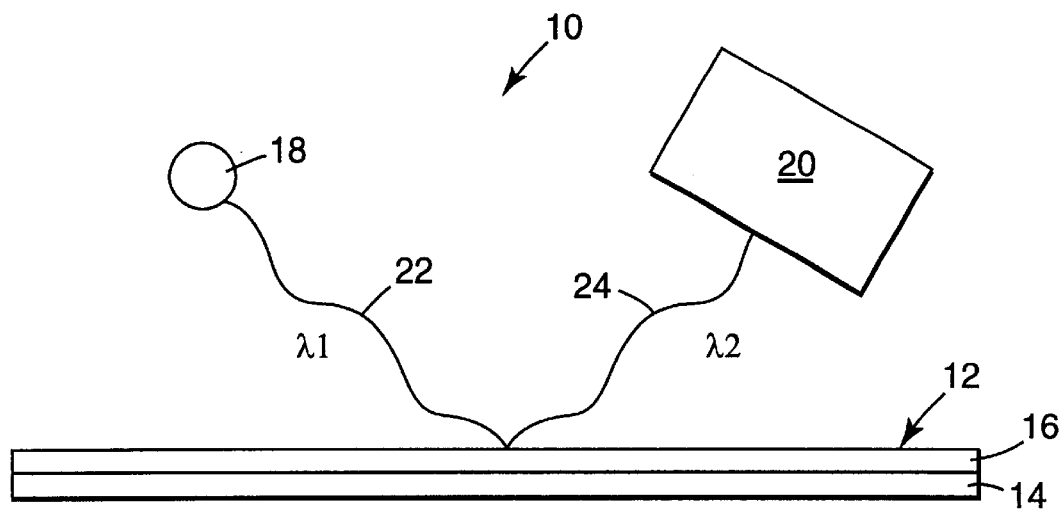
FIG. 1 is a schematic side elevational view of a thin film measuring system constructed and arranged in accordance with the present invention.

While the invention is susceptible to various modifications and alternative forms, specifics thereof have been shown by way of example in the drawings and will be described in detail. It should be understood, however, that the intention is not to limit the invention to the particular embodiments described. On the contrary, the intention is to cover modifications, equivalents, and alternatives falling within the spirit and scope of the invention as defined by the appended claims.

DETAILED DESCRIPTION OF THE INVENTION

The present invention is directed to a method and apparatus for measuring the thickness of a coating composition. The method includes providing a radiant energy source and directing radiant energy onto a coating composition that has fluorescent properties. The radiant energy is, for example, visible or ultra-violet light. When light of a first wavelength is directed onto the coated surface, the coating composition absorbs the light and emits light of a second wavelength. The intensity of the light of the second wavelength is measured by use of a solid state array of light sensitive elements. The thickness of the coating composition is determined at multiple points along the coated surface based upon the intensity of the light of the second wavelength measured by the solid state array of light sensitive elements.

In reference to the appended figures, FIG. 1 shows a schematic cross section of a system 10 for measuring the thickness of a coating. System 10 gives accurate, high definition, real time measurements of the thickness of a coated film 12. Coated film 12 includes a base film 14 and a coating composition 16 applied to the top of the base film 14. It will be appreciated that coated film 12 is a layered product: a base film 14 onto which is deposited the coating composition 16. In specific implementations of the present invention, the objective is to determine the thickness of coating composition 16. The present invention is also applicable to certain implementations wherein the combined thickness of the base layer 14 and the coating composition 16 is measured. In such implementations, the base layer 14 and coating composition 16 are both fluorescent. The coated surface 12 is either a single layer or is multiple layers.

System 10 includes light source 18 and solid state array of light sensitive elements 20. Light waves 22 having a wavelength of $\lambda_1$ are emitted from light source 18 and directed onto coated film 12. Coating composition 16 absorbs light of wavelength $\lambda_1$, and emits light waves 24 having wavelength $\lambda_2$. Light waves 24 are received by solid state array 20, which measures their intensity.

The intensity of the light waves 24 provides an indication of the thickness of coating composition 16. This indication of coating thickness is provided because coating composition 16 is fluorescent and selectively absorbs light of the first wavelength $\lambda_1$, and emits light of the wavelength $\lambda_2$. The intensity and wavelength of the emitted light waves 24 is dependent on the fluorescent properties of the coating composition 16 and the intensity and wavelength of the incoming light waves 22. When the intensity and wavelength of the incoming light is constant, then the intensity of the emitted light waves 24 varies with the fluorescent properties of the coating composition 16. If the coating composition 16 is substantially homogeneous, then the intensity of the emitted light 24 varies with the thickness of the coating composition 16. A thicker coating composition 16 will contain a greater quantity of the fluorescing material than a thin coating and will produce light waves 24 of a greater intensity than a thin coating. This characteristic is observed on coatings sufficiently thin that they do not demonstrate significant absorbency of the light of wavelength $\lambda_2$.

It is noted that while the wavelengths of light are referred to as $\lambda_1$ and $\lambda_2$, each of these wavelengths, and the other wavelengths referred to herein, are not necessarily discrete single wavelengths but may be one or more wavelengths denoted generally, for example, as $\lambda_1$, etc. Thus, the light waves 22 emitted from light source 18 may be more than one wavelength. Indeed, in many implementations, light source 18 emits a spectrum of light containing a number of different wavelengths. In these cases, $\lambda_1$ denotes this spectrum of wavelengths of light rather than a single wavelength. Similarly, the emitted light waves $\lambda_2$ may be a spectrum of light. However, while $\lambda_1$ and $\lambda_2$ may each be discrete spectra of light and may have some overlap, the two spectra are not identical.

Light source 18 is a radiant energy source. The radiant energy is any type of radiant energy that will cause fluorescence of the fluorescer within coating composition 16. Examples of useful radiant energy sources include those that emit thermal energy (heat or infra-red radiation), e-beam radiation, microwave radiation, UV radiation, gamma radiation, visible radiation, and the like.

Figure 4:
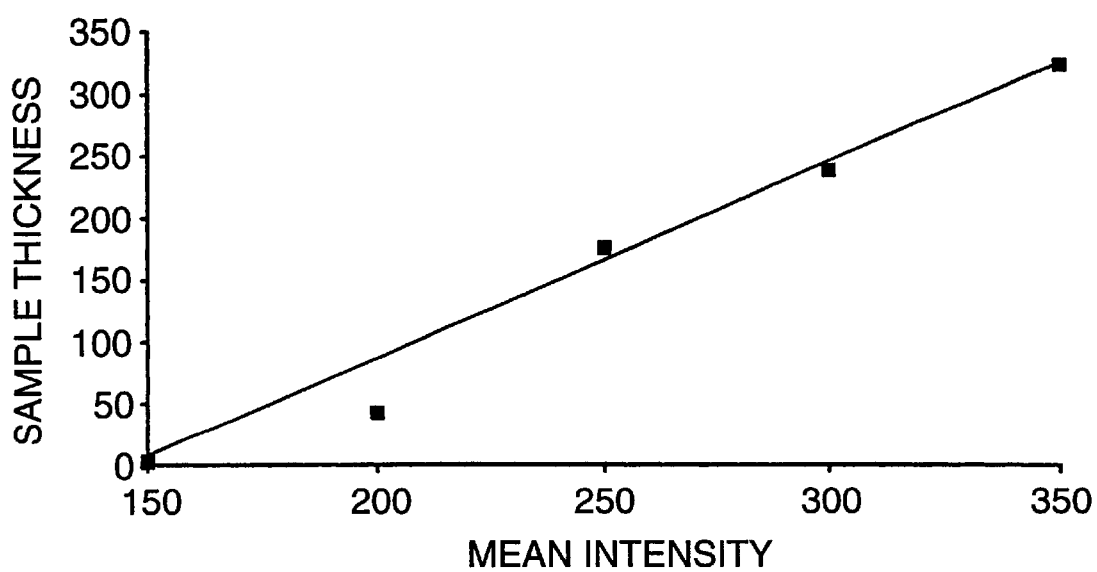
FIG. 4 is a chart depicting the relationship between coating thickness and fluorescent intensity.

Solid state array 20 includes a multitude of light sensitive elements. These elements are characterized by the ability to absorb light and provide an electronic output of the simultaneous light intensity at a multitude of measured points along the coated surface 12. At each measured point, the thickness of the coating composition is determined by the formula:

$$\text{Coated\_Surface\_Thickness} = T_{S_i} = \frac{(T_{R_i})}{(I_{R_i} - I_{B_i})} \times (I_{S_i} - I_{B_i})$$

wherein $T_{S_i}$ = thickness of coated surface;

$T_{R_i}$ = thickness of reference;

$I_{R_i}$ = intensity of reference;

$I_{B_i}$ = intensity of backing;

$I_{S_i}$ = intensity of coated surface;

The relationship between coating thickness and intensity is depicted below in Table 1 and in FIG. 4. As is indicated in Table 1 and FIG. 4, the mean intensity of emitted light increases as the thickness of the coating composition increases. While this general principal applies to various coating compositions, it will be appreciated that depending upon the fluorescer in the coating composition, the slope of the intensity line in FIG. 4 will vary. Thus, a coating composition with a low amount of fluorescer will produce a more vertical intensity line, while a high amount of fluorescer will produce a more horizontal intensity line.

TABLE 1

| Sample Thickness | Mean Intensity | Standard Deviation of Mean Intensity |
| --- | --- | --- |
| 350 nm | 325.05 | 2.11 |
| 300 nm | 238.85 | 0.49 |
| 250 nm | 176.55 | 0.69 |
| 200 nm | 42.65 | 0.62 |
| 150 nm | 2.25 | 0.57 |

Due to random noise and the non-uniformity of the optical field of the measurement system, even for a perfectly uniform coated surface or backing, the output of the solid state array tends to be a non-linear curve. Therefore, the intensity of the light of the second wavelength cannot always be determined by an arithmetic average of the outputs of the array elements because, for example, the optics may return a greater percentage of the light from the central array elements than from the peripheral array elements. To correct for this difference, a smooth curve, P(x), is fitted to the array output, where x is the crossweb position. The maximum of this fitting curve is defined as the measured intensity, and the ratio of the maximum value to the fitting curve provides a normalization coefficient, G(x), for each array element. G(x) is time invariant.

In addition to the normalization, the thickness vs. intensity curve is predetermined by a calibration. This curve, i.e. a function of T=F(I) where T=thickness and I=intensity, shows the relationship between the thickness of a coated surface T and the intensity $I=I_s-I_B$ where $I_S$ and $I_B$ are the measured intensities of the coated surface and backing, respectively. The curve is generated by coating uniform samples of the backing with different known coating thickness' $T_{Ri}$ and then measuring their intensity $I_{Ri}$ and the intensities of backing $I_{Bi}$. Experimentation has shown that the relationship between coating thickness and fluorescence intensity is linear in the range of thin coating thickness. Thus, a line is fitted to the calibration data $(T_{Ri}, I_{Ri}-I_{Bi})$. This line is the Thickness vs. Intensity curve in the range of thin coating thickness'. In order to obtain an accurate Thickness vs. Intensity curve, multiple samples with known coating thickness are preferably measured. In addition, the coating thickness' of these samples should be preferably distributed uniformly in the range of thin coating thickness.

The intensity of a uniform sample $I_{Rc}$ that is measured for the calibration of the Thickness vs. Intensity curve may be different from the real-time measured intensity of the same sample, say $I_{Rr}$. Similarly, the intensity of a uniform backing $I_{bc}$ measured during the calibration may be different from the real time measured intensity of the same backing, say $I_{br}$. However, experimental results indicate that the ratio:

$$\rho = \frac{I_{Rc}}{I_{Rr}} = \frac{I_{Bc}}{I_{Br}}$$

is essentially independent of the thickness of the sample and stable in a relatively long time interval. ρ is a coefficient that compensates for any change in light intensity, etc. over time. $I_{Br}$ is also stable in a relatively long time interval and is independent of the crossweb position when the backing is uniform.

The real-time output of an array element, say $I_S(x,t)$, where x and t represent crossweb position and time respectively, can be determined by:

$$T_s(x,t)=F(I(x,t))$$

where $$I(x,t)=(I_s(x,t)*(G(x)-I_{Br})*\rho$$

Figure 2:
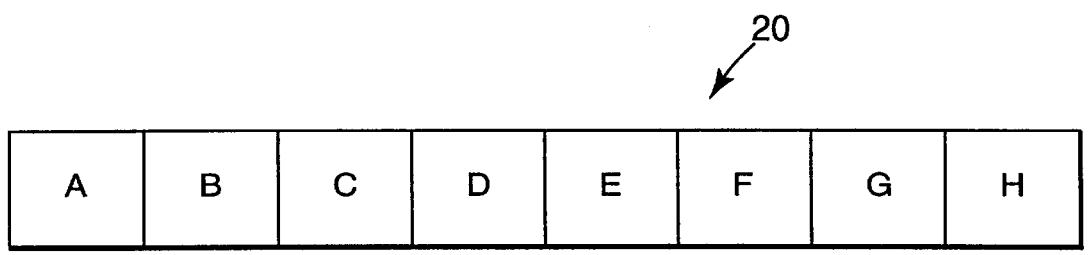
FIG. 2 is a schematic front elevational view of a linear solid state array of light-sensitive elements constructed and arranged in accordance with the present invention.

In reference now to FIG. 2, showing a schematic front elevational view of a solid state array of light-sensitive elements 20. The light-sensitive elements are indicated as individual elements are listed as A, B, C, D, etc. The array of light-sensitive elements 20 is oriented above the coating composition as shown in FIG. 1. Each element A, B, C, D, etc. corresponds to a specific portion of the coating composition. In general, the larger the array, the higher the resolution and detailed measurements that are made.

The fluorescer within the coating composition is selected from compounds that absorb radiant (excitation) energy of a first wavelength, and fluoresce (emit) radiant energy of a second wavelength. The excitation wavelength $\lambda_1$ is typically among a range of excitation wavelengths, wherein one or more wavelengths within the range of the excitation wavelength is useful to excite the fluorescer to fluoresce radiant energy. The emitted wavelength $\lambda_2$ is included within a range of wavelengths emitted or fluoresced by the fluorescer upon excitation.

In specific implementations, the excitation wavelengths $\lambda_1$, fall somewhere within the range from about 250 to 550 nanometers, or from 250 to 440 nanometers. The emitted wavelength $\lambda_2$ falls somewhere within the range of 300 to 600, or from 300 to 450 nanometers. Typically, the excitation wavelength $\lambda_1$ is shorter than the emitted wavelength $\lambda_2$.

The intensity of emitted light from the coated film 12 will vary based upon the quantity of fluorescer within the coating composition 16. Preferred fluorescers include, but are not limited to: biphenyl, flourene, and flourene derivatives such as N-Decyl flourene, 9-9 dibutyl flourene, and 9,9-decyl, 9-methyl flourene. In practice of the present invention, the intensity of the radiant energy emitted by a fluorescer can be measured at any wavelength $\lambda_2$ within a range of wavelengths emitted by the fluorescer upon excitation. Further, any wavelength X, of the excitation spectrum can be used to excite a fluorescer and cause fluorescence through the range of the wavelengths of the emission spectra. Preferably, the excitation wavelength $\lambda_1$ is chosen to prevent interference with the measured emission wavelength $\lambda_2$. For example, with a biphenyl fluorescer, the excitation energy used to measure fluorescence emission at a wavelength of about 290 nanometers is preferably less than about 270. In specific implementations of the present invention, the wavelength of the excitation energy is shorter than the wavelength of the emission energy.

Figure 3:
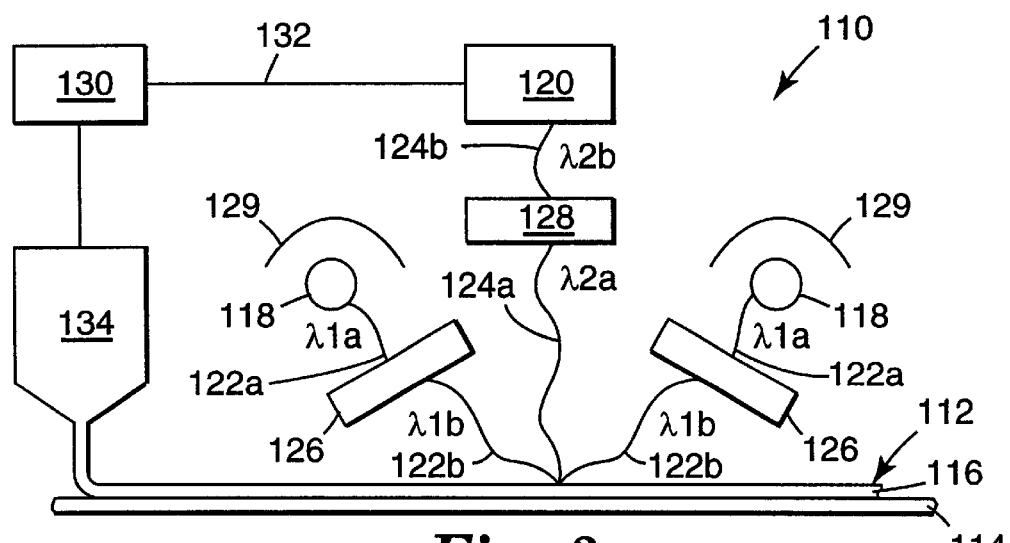
FIG. 3 is a schematic side elevational view of a second thin film measuring system constructed in accordance with the present invention, showing a feedback control loop for adjusting application of the thin film.

Another implementation of the present invention is shown in FIG. 3, depicting a schematic cross-section of a system 110 for measuring the thickness of a coated surface. The system 110 gives high accuracy, high definition, real time measurements of the thickness of coated film 112. Coated film 112 includes a base film 114 and a coating composition 116. Light sources 118 and solid state array 120 respectively emit and receive radiant energy. Light waves 122a having a wavelength of $\lambda_{1a}$ are emitted from the light sources 118. The light waves 122a are filtered through bandpass filters 126. Bandpass filters 126 narrows the spectrum of light waves 122a and only light waves 122b having wavelength $\lambda_{1b}$ pass through filter 126. Thus, $\lambda_{1b}$ is a subset of $\lambda_{1a}$, and light waves 122b are a subset of light waves 122a. The intensity of light waves 122b is necessarily reduced from the intensity of light waves 122a. Passing of light waves 122a through the band pass filter 126 allows for selection of a specific spectrum or wavelength of light $\lambda_{1b}$ of excitation light, and also allows for removal of undesirable portions of the spectrum from light 122a. For example, it is advantageous in certain implementations to remove light of the emission wavelength of the coating composition 116. Removal of the emission wavelength is important, for example, to prevent reflection of light from the coating composition from interfering with the measurements of emitted light. If the reflected light and emitted light have the same wavelength, the measured thickness of the coating composition can be improperly increased by measuring reflected light.

Coating composition 116 absorbs excitation light 122b of wavelength $\lambda_{1b}$ and emits light 124a of wavelength $\lambda_{2a}$. Emitted light 124a passes through a second band pass filter 128, which narrows the spectrum from $\lambda_{2a}$ to $\lambda_{2b}$. The narrowing of the spectrum from $\lambda_{2a}$ to $\lambda_{2b}$ is done to facilitate accurate measurements by limiting the light 124b that strikes the solid state array of light sensitive elements to a specific wavelength or wavelengths that include the emitted light from the fluorescent coating composition and filter out reflected light.

FIG. 3 also shows a processor unit 130 and feedback loop 132 joining to the coating composition 134. Processor unit 130 receives the measured intensity of the light 124b and determines whether or not the coating is evenly applied and at a desired thickness. If the coating is not being properly applied, processor unit 130 communicates by feedback loop 132 to the coating applicator 134, and adjustment is made to the thickness of coating composition as it is applied.

The various embodiments described above are provided by way of illustration only and should not be construed to limit the invention. Those skilled in the art will readily recognize various modifications and changes that may be made to the present invention without strictly following the example embodiments and applications illustrated and described herein, and without departing from the true spirit and scope of the present invention, which is set forth in the following claims.

We claim:

1. A method of measuring the thickness of a coating on a moving web, the method comprising:

a) providing a web surface having a fluorescent coating;

b) providing a light source;

c) directing a first wavelength of light from the light source onto the coated web surface such that the coated surface absorbs the first wavelength of light and emits a second wavelength of light;

d) measuring the intensity of the second wavelength of light by use of a solid state array of light-sensitive elements, wherein each element measures light corresponding to a portion of the web surface; and e) determining the thickness of the coating based on the measured intensity of the second wavelength of light from the array of the light-sensitive elements;

wherein determining the thickness of the coating comprises normalizing the measured intensity of the second wavelength of light at each element of the array based on the relative position of the portion of the web surface being measured.

2. The method according to claim 1, wherein the measured intensity is normalized to increase the measured intensity for array elements positioned at an edge of the web.

3. The method according to claim 1, wherein the measured intensity at each array is normalized by the ratio of the measured peak intensity of light from a uniform coated surface to the measured intensity of light at each array.

4. A method of measuring the thickness of a coating, the method comprising:

a) providing a surface having a fluorescent coating;

b) providing a light source;

c) directing a first wavelength of light from the light source onto the coated web surface such that the coated surface absorbs the first wavelength of light and emits a second wavelength of light;

d) measuring the intensity of the second wavelength of light by use of a solid state array of light-sensitive elements, wherein each element measures light corresponding to a portion of the web surface; and e) determining the thickness of the coating based on the measured intensity of the second wavelength of light from the array of light-sensitive elements by normalizing the measured intensity of the second wavelength of light at each element of the array based on the relative position of the portion of the web surface being measured.

5. The method according to claim 4, wherein the measured intensity is normalized to increase the measured intensity for array elements positioned at an edge of the web.

6. The method according to claim 4, wherein the measured intensity at each array is normalized by the ratio of the measured peak intensity of light from a uniform coated surface to the measured intensity of light at each array.

* * * * *

UNITED STATES PATENT AND TRADEMARK OFFICE
CERTIFICATE OF CORRECTION

PATENT NO. : 6,252,237 B1
DATED : June 26, 2001
INVENTOR(S) : Ramthun et al.

It is certified that error appears in the above-identified patent and that said Letters Patent is hereby corrected as shown below:

Column 6,
Line 34, "N-Decyl" should read -- NN-Decyl --
Line 39, "X" should read -- $\lambda_1$ --
Line 46, insert -- nanometers -- after "270"

Signed and Sealed this

Seventh Day of May, 2002

Attest:

JAMES E. ROGAN
*Attesting Officer*  *Director of the United States Patent and Trademark Office*